(12) United States Patent
Raedts

(10) Patent No.: US 12,270,794 B2
(45) Date of Patent: *Apr. 8, 2025

(54) DIRECT CAPTURE USING LARGE BEAD CHROMATOGRAPHY MEDIA

(71) Applicant: PROXCYS HOLDING B.V., Emmen (NL)

(72) Inventor: Marcellus Johannes Hubertus Raedts, Emmen (NL)

(73) Assignee: PROXCYS HOLDING B.V., Emmen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,845

(22) Filed: Nov. 20, 2023

(65) Prior Publication Data

US 2024/0151695 A1  May 9, 2024

Related U.S. Application Data

(63) Continuation of application No. 16/963,784, filed as application No. PCT/NL2019/050038 on Jan. 22, 2019, now Pat. No. 11,867,670.

(30) Foreign Application Priority Data

Jan. 22, 2018  (NL) .................................... 2020305
Jan. 21, 2019  (NL) .................................... 2022427

(51) Int. Cl.
*G01N 30/52* (2006.01)
*B01D 15/18* (2006.01)
(Continued)

(52) U.S. Cl.
CPC ......... *G01N 30/52* (2013.01); *B01D 15/1871* (2013.01); *G01N 30/603* (2013.01); *G01N 2030/386* (2013.01)

(58) Field of Classification Search
CPC ................ G01N 30/52; G01N 30/603; G01N 2030/386; B01D 15/1871
See application file for complete search history.

(56) References Cited

U.S. PATENT DOCUMENTS 3,398,512 A   8/1968  Perkins, Jr. et al.
4,627,918 A  12/1986  Saxena
(Continued)

FOREIGN PATENT DOCUMENTS

WO  2007136247 A1  11/2007
WO  2012081983 A1   6/2012

OTHER PUBLICATIONS

U.S. Appl. No. 16/963,784, filed Jul. 21, 2020.
(Continued)

*Primary Examiner* — Benjamin L Lebron
(74) *Attorney, Agent, or Firm* — NIXON & VANDERHYE

(57) ABSTRACT

Disclosed is a continuous process in which a subset of a number of mutually identical columns, are connected in series. The process liquid, e.g. crude cell culture harvest, is supplied to the most upstream column of the subset. It flows successively through the in series connected columns and leaves the subset through the most downstream and flows into the downstream collection vessel. As soon as the packed bed of the most upstream column is become saturated with product, this column is disconnected from the subset. It is removed from the series connection. A replacement, identical, column is added such that it is connected in series downstream from the most downstream column of the subset. This process is repeated.

18 Claims, 6 Drawing Sheets

(51) Int. Cl.
*G01N 30/38* (2006.01)
*G01N 30/60* (2006.01)

(56) References Cited

U.S. PATENT DOCUMENTS

| | | | |
|---|---|---|---|
| 4,676,898 | A | 6/1987 | Saxena |
| 5,466,377 | A | 11/1995 | Grandics et al. |
| 2013/0270167 | A1 | 10/2013 | Raedts |
| 2017/0157532 | A1 | 6/2017 | Derez et al. |
| 2017/0204446 | A1 | 7/2017 | Cattaneo et al. |
| 2017/0333957 | A1 | 11/2017 | Rosengren et al. |

OTHER PUBLICATIONS

Besselink et al., "Are axial and radial flow chromatography different?", Journal of Chromatography A, 2013, vol. 1271, pp. 105-114.

Cabanne, C., et al., "Evaluation of radial chromatography versus axial chromatography, practical approach", Journal of Chromatography B, 845, pp. 191-199. (Year: 2007).

Hilbold et al., "Continuous Progress", Innovations in Pharmaceutical Technology, Mar. 2014, Issue 48, pp. 44-47.

Holzer et al., "Multicolumn Chromatography, A New Approach to Relieving Capacity Bottlenecks for Downstream Processing Efficiency", BioProcess International, Sep. 2008, 5 pages.

International Search Report and Written Opinion of the ISA for PCT/EP2019/050839 dated Sep. 2, 2019, 16 pages.

Jungbauer, A., Continuous downstream processing of biopharmaceuticals, Trends in Biotechnology, 31, 8, pp. 479-492. (Year: 2013).

Kinna et al., "IMAC Capture of Recombinant Protein From Unclarified Mammalian Cell Feed Streams", Biotechnology and Bioengineering, 2015, vol. 9999, 11 pages.

Raedts, Marcellus. "Proxcys b.v.", Sep. 4 (Year: 2013).

Saxena et al., "Applications of radial flow cols. for fast affinity chromatography", International Laboratory, Jan-Feb. 1988, vol. 18, 6 pages, No. 1, XP001270273.

DIRECT CAPTURE USING LARGE BEAD CHROMATOGRAPHY MEDIA

CROSS REFERENCE TO RELATED APPLICATIONS

This application is a Continuation of application Ser. No. 16/963,784, filed on Jul. 21, 2020, which is the National Phase under 35 U.S.C. § 371 of International Application No. PCT/NL2019/050038, filed on Jan. 22, 2019, which claims the benefit under 35 U.S.C. § 119(a) to Patent Application Nos. 2020305, filed in the Netherlands on Jan. 22, 2018 and 2022427, filed in the Netherlands on Jan. 21, 2019, all of which are hereby expressly incorporated by reference into the present application.

BACKGROUND OF THE INVENTION

Field of the Invention

The present invention relates to direct or primary capture (e.g. capture of product from crude feed) of a product present in a, preferably unclarified (in other words not cleaned), process liquid using a column (e.g. radial flow type) for liquid chromatography comprising a packed bed of large beads. In particular the invention relates to downstream processing of biologics from cell culture or cell fermentation harvests and to a related liquid chromatography system.

Description of the Related Art

It is often necessary or desirable to fractionate a fluid mixture to separate out or isolate useful or desired components. This can be achieved by using liquid chromatography systems.

Chromatography systems of various sizes are used in both laboratory analysis operations and for industrial scale production operations in which separation steps such as fractionation from human blood or capturing or removing impurities from a pharmaceutical can be carried out on a large scale in a batch process and nowadays also in a continue process.

Liquid chromatography may briefly be described as the fractionation of components of a mixture based on differences in the physical or chemical characteristics of the components. The various liquid chromatographic systems fractionate the components with a fractionation or solid matrix. Some liquid chromatographic matrix systems fractionate the components of a mixture based upon such physical parameters as molecular weight. Still other liquid chromatographic systems will fractionate the components of a mixture based upon such chemical criteria as ionic charge, hydrophobic nature, and the presence of certain chemical moieties such as antigenic determinants or lecithin-binding sites on the components, together characterized as "affinity" moieties.

Liquid chromatography often uses a separation column. The separation column contains a stationary phase, packing, packed bed or matrix medium or material, as well known in the art, which interacts with the various components of the sample fluid to be separated. The composition of the separating medium depends on the fluid being directed there through so as to produce the desired separation.

In order to prepare a chromatographic column to be able to separate biological substances effectively, it is usual to pack fine particles of separation material as tightly and as uniformly as possible in the column tube, the packed bed. Filling of the column, or column packing as it is often referred to, is normally effected by closing one end of the column with an outlet means which includes a filter element, and pouring or pumping under pressure a liquid suspension of the particles into the column from the other end of the column. Whereas the pumped liquid is able to pass through the filter element essentially unobstructed, the particles are retained by the filter element, so as to build up a particle bed along the length of the tube. As the column tube is filled, the particles are pressed out towards the wall of the tube and the particle bed obtains a stable compaction state with the particles well distributed by the pressure generated by the pump or compression of the top filter, this state being maintained during the whole of the filling process.

The first type separation columns generally known in the art are of a cylindrical construction and the fluid flows axially through a separating medium bed (packing or matrix) retained in the column. The medium bed is retained between supports or frits on either or both ends of the column. As the sample (also called "feed") or elution (also called "desorption") fluids pass through the separating medium bed, the constituents of the relevant fluid travel at different rates due to their different interaction with the matrix or packing material. As a result, these constituents emerge separated (i.e., have different elution times) in the outlet stream of the column.

With the need for high performance, low pressure chromatography, horizontal or radial flow type chromatographic columns were developed. Such horizontal or radial flow columns are, e.g., described and claimed in U.S. Pat. Nos. 4,627,918 and 4,676,898. In the horizontal or radial flow type columns, the sample/adsorption and elution/desorption fluids are introduced via a distributor to the outer periphery or circumferential wall or surface of the separating medium or matrix, which consists of packing material, where the components get separated and the fluids pass horizontally or radially inwardly through the separation medium to a central or collection port and then elute from the column at different times and at different rates. This horizontal flow column design has a high cross sectional area and very low effective bed height. It thus offers the ability to handle very high flow rates at low operative pressures.

As used herein, the terms "horizontal or radial flow mode", which are used interchangeably, are defined as flow of the sample (e.g. biomolecules) or eluant or wash fluid through the chromatographic column in a direction that is perpendicular to the longitudinal axis of the column, regardless of the position of the column relative to the work bench or support stands or other equipment used to support or stack the columns.

This chromatographic separation in a horizontal mode may be accomplished by means of a chromatographic column constructed so as to have an inner and outer annulus, with the matrix material being packed there between, thus having a torus or doughnut shape. The bed height is thus computed as the distance between the inner and outer annuli. Chromatography consequently takes place radially in the column.

This horizontal mode column configuration results in even bed height since the inlet and outlet distributors are fixed. The distributor and collection channels are designed to provide even application of the sample and horizontal streamlines across the chromatographic bed. The long, vertical column assembly with horizontal flow is easy to fabricate and convenient for packing and handling. Furthermore, since the bed height is constant along the length of the column, both the cross-sectional area and bed volume are proportional to the column length. Thus, scale-up is possible by linearly increasing the length of the column in proportion to the desired scale of operation. At any scale of operation, the pressure drop remains constant and scale up is accomplished easily by linear increments of the column bed length.

The horizontal mode column is particularly applicable to high performance low pressure chromatography used in conjunction with the separation of biomolecules like proteins or other organic or inorganic compounds particularly sensitive to shear forces. This column type is capable of use both in high performance and conventional chromatography, in the identification and separation of mixtures in the preparative mode, and also provides scale-up to larger columns for use in the isolation of components from mixtures in quantities suitable for industrial or production purposes.

The development of chromatography columns has aimed at providing ease of operation and various additional benefits which have particular commercial importance. These include: (a) the ability to be sterilized by autoclaving; (b) improved sanitation by virtue of design features giving less carryover of product from one batch to the next; (c) the ability to resist solvents; (d) material conformity to food grade FDA regulations; (e) an improved pressure tolerance; (f) lower cost; (g) the potential for full or partial automation; (h) the ability to provide disposable columns; (i) linear process upscale.

During use, the performance of the packed bed, i.e. the beads, is constantly deteriorating. Since the beads typically are extremely expensive (in the order of euro1-20/milliliter), at least for industrial application, the packed bed should be used-up completely. The same packed bed is preferably used many times (200 times being the practical limit) and cleaned thoroughly before each next time (i.e. between each two successive uses). Despite all care, the theoretical maximum number of uses is hardly matched in case of use that covers a period of many months (say 6 or 12 months), due to aging. Aging is aggravated due to the inevitable inability of complete removal of any possible contamination during cleaning between two subsequent uses.

BACKGROUND SPECIFIC TO DIRECT CAPTURE

Now, information more specific to direct capture is provided by way of mammalian cell culture as an illustrative example of biomolecules.

Bio-pharmaceutical products, often therapeutic proteins can be produced by a multitude of organisms. The most common production method today is mammalian cell-culture in which the micro-organisms are grown and are programmed to produce an extra special compound that normally would not be produced by this (e.g. CHO) cell. The therapeutic product programmed for is the target Active Pharmaceutical Ingredient (also called API). Since many biological compounds carry the signature of the (non-human) host, a product produced by a non-human cell can cause rejection by the receiver, cell-culture cells are there for "humanized". This is done by fusion with mammalian cells to yield the human signature and is called mammalian cell culture. The mammalian cells are grown in a big container in which a carefully balanced power-cocktail, the culture media, supports their growth. The media contains all nutrients to get exponential cell growth. When the cell is programmed well, it will produce the compound of interest in large quantity and when possible, excretion of the API into the surrounding media (extra cellular). A typical cell culture volume for API production is 1,000-10,000 litre.

A drawback of the these perfect miniature machines is the fact that the fusion cells are more vulnerable. The cells must be treated gently to prevent breaking (in other words they have to be kept viable). Broken cells result in two issues: the cells stop producing, but more important their internal mass is excreted into the culture media. The Host Cell Protein (HCP) and Host Cell DNA are contaminating the media which makes purification much more difficult and digestive enzymes from the internal cell are starting to digest all protein in the media, i.e. also the target API. During cell culturing mixing is done gently and even sparging with air can cause cell breakage. When the cell culture reaches its limit in growth, the culture is harvested. Harvesting the 1,000-10,000 litre cell culture in short time without rupturing the cells is the big challenge.

Current state of the art at industrial scale is rapid clarification, centrifugation and/or filtration of the cells, isolating the cells-mass from the surrounding media (the plasma) that is containing the API. Unfortunately also centrifugation and filtration cause cells to rupture and thus contamination of the plasma. Unclarified/crude e.g. means without filtration and/or centrifugation of the to the column fed process liquid.

A few decades ago Expanded Bed Adsorption (EBA) was invented to offer processing of the crude feed without clarification. This process is sometimes called "fluidized bed adsorption". Through the bottom of a settled slurry of chromatographic beads, the cell culture is fed into the bed. There is no limiting sieve or other restriction above the settled beads and the bed is allowed to expand upward by force of the upward flow. The columns are tall and to allow the bed to expand freely, when settled, only about ⅓ is filled with the settled beads. The absence of resistance however caused preferential paths and therewith patches of stagnant accumulating cells causing contamination outside the paths. To prevent this, the chromatographic beads are artificially made heavier by including a metal core. So the settled beads are heavy creating a density (resistance) i.e. a dynamic pore-size reduction, forcing the cells to evenly distribute over the entire surface of the bottom and forcing the beads to make room for passage. Although this technique works well in some cases, it is difficult to control and often is not very robust.

Pertinent Background Art

U.S. Pat. No. 5,466,377A (Grandics et al., published 1995) discloses the use of large bead chromatography particles in standard or conventional, low pressure, packed bed chromatography columns for the direct capture of product from an unclarified process liquid as a system for downstream processing of biologics from a different type of homogenized cell culture, microbial cell culture or bacterial cell fermentation harvests that employs micro-organisms that are about 0.5 to 1 micrometer and at least 10 times smaller than mammalian (CHO) cells. Disclosed is the use of an axial type column of 1.5 centimetre diameter with end-plate screens with large pores (60-180 micrometer, equals 0.06-0.18 millimeter, pores), beads having a diameter of 100-300 or 300-500 or 500-800 or 800-11000 micrometer (equals 0.1-0.3 or 0.3-0.5 or 0.5-0.8 or 0.8-1.1 millimeter, respectively), and a bed volume of 9 milliliter. No further information is provided for the column. However from the data provided for column diameter and volume the "bed height", meaning the axial distance between the end-plate screens, can be calculated and equals 5.0 centimetre. At this small scale of operation in an experimental laboratory environment, the in here mentioned problems, e.g. relating to contamination, aging and completely using-up of the packed bed for economy reasons, generally are absent. However, attempts for full scale production at economic level showed that the axial column type is unsuited for industrial application of direct capture even with the demonstrated homogenates and much smaller bacterial cells.

SUMMARY OF THE INVENTION

The object of the invention is versatile and, according to a first aspect, to provide an improved, contamination free, low pressure, gentle acting packed bed chromatography column packed with large beads for effective direct capture of product, e.g. biomolecules) from an unclarified (or crude) process liquid, and related process, in particular for downstream processing of biologics from mammalian CHO or similar cell culture or cell fermentation harvests (cell culture density typically above 0.1 or 0.5 or 1 or 2 and/or below 50 or 100 million cells per milliliter). In a second aspect the first downstream processing step, the primary capture of said high density cell culture harvest, is in the radial flow packed bed capture column, directly from the cell culture vessel without any intermediate, filtration or other clarification equipment, nor any harvest holding-step or holding vessel.

The processed cell culture liquid, depleted from the product of interest, is leaving the primary capture column (typically containing cellular/particulate content) directly into a, e.g. waste or collection vessel. By the removal of the filtration equipment, a reduction of capital cost and setup time is achieved, while the removal of the harvest holding vessel reduces the available incubation time for proteolytic attack and autodigestion of the product of interest by host cell enzymatic activity during its residence time in the vessel and hence removing the vessel will reduce the risk of product damage or digestion. Avoiding cell damage is also an object. Further objects can be found elsewhere in this disclosure.

According to the invention the solution is provided by application of a high performance chromatography column that is characterized by a packed bed and by horizontal or radial flow through the packed bed. In here, this direct capture technology using radial flow is also called cTRAC (cell Tolerant Radial Affinity Chromatography). It will be appreciated that a column designed for radial flow typically means that the packed bed is torus or doughnut shaped, although alternative designs are also covered, preferably designs which mimic the flow conditions of a radial flow type column, e.g. wedge or conical shaped, wherein the surface area (I) of the one frit is bigger compared to the other (O), to suffice the functional I/O requirement. Typically, the frit through which the liquid to be processed enters the packed bed, also called the inlet frit, has the larger surface area compared to the frit through which the liquid exits the packed bed, also called the outlet frit. Thus, the liquid to be processed typically flows radially inward from the inlet frit towards the outlet frit. The typical upstream holding vessel can also be avoided such that the liquid from the cell culture can be directly fed to the chromatography column.

Surprisingly, the present inventor discovered that a properly designed, properly balanced column of radial type can create the additional dynamic resistance required to result in even distribution of the liquid over the entire surface area without reduction of pore-size. The cTRAC radial column features an inlet surface area which is larger than the exit surface area. The packed bed is radial-shaped, wedge-shaped or conical shaped. The packing density of the packed bed is properly controlled by the annular packing method resulting in an even distribution of bead-porosity all over the packed bed. The interstitial volume between the packed beads is identical at the inlet (the larger surface) as compared to the outlet (the smaller surface). Therefore the interstitial pore-size is constant across the entire column. Also, there is no need for a clarification and/or harvest holding step prior to the column and during flow of the process liquid through the column, the liquid leaving the column (typically cellular/particulate content) can be fed directly into a, e.g. waste, collection vessel. If processing an e.g. high density continuous-perfusion, cell culture, in which the culture cells are e.g. retained within the cell culture upstream the column, resulting in a cell culture with extreme cell densities and in which only a relative small volume containing a limited amount of cell matter continuously is send to be processed downstream, the column can be fed, e.g. connected, directly by/to the cell culture exit with the option to either recycle the feed via the effluent (partly) back into the upstream source, e.g. continuous-perfusion cell culture, or send the column output into the, e.g. waste, collection vessel.

This solution was a surprise since passing cells (typically 5-20 micrometer) through a packed bed without the problems mentioned above (e.g. blocking, contamination, economy of use) was always considered impossible for industrial or rational application. On the one hand the bigger beads packed into a homogenous matrix, leave an "open space" between them, the interstitial volume, which is beneficial. Through this interstitial volume the cells are able to flow with only limited or even without obstruction (resistance, shear forces). The low or even lacking resistance is good for cell viability, cells are flowing gently with low or even without obstruction between the beads towards the exit of the column. The driving force for cell travel is the flow of liquid. However, the low or even lacking resistance also means a tendency for preferential paths, cell accumulation and contaminating patches and complete blocking like in the earlier EBA example.

Likewise and in parallel to the earlier EBA example, the main challenge in the application of a packed bed chromatography is to force the incoming liquid to evenly distribute over the entire surface preventing preferential paths, without creating pore size reduction since in a packed bed this would be static and would result in immediate column blocking. In the case of earlier reported attempts with traditional (axial) chromatography columns with packed bed, columns would either block and/or contaminate.

Without being bound to theory, it is believed that the surprising effect of the present invention can be explained by the equation of Kozeny-Karman (viz., e.g., Besselink: Are axial and radial flow chromatography different?; Journal of Chromatography A; 1271(2013) 105-114). According to this equation, the increase in the superficial velocity causes an increase in resistance to flow between the beads. Further, the increase in superficial velocity seems proportional to the I/O-ratio (sometimes referred to as "α" or "alpha") which is directly related to the shape of the radial column.

The decrease of surface area towards the exit of a radial flow type column results in a local flow velocity increase, which without reduction of the interstitial space causes an increase in resistance which in turn causes an even distribution of liquid over the whole surface. Although the surface at the exit is smaller, focusing the liquid flow like an optical lens, the even distribution is transferred to the larger surface at the entry. In stead of a radial inward flow, a radial outward flow through the packed bed could be applied for the inventive column.

Also another issue that is absent in case of the EBA but indeed present in case of packed bed columns is the sieve (frit) in between which the bed is packed and that separates the internal volume from the outside flow-path. Experiments have shown that only a very thin and open/smooth structured frit will allow cells to pass without rupturing or different damage.

The thin and open structured frits of the preferred radial flow column allow superior cell viability. The cylindrical form of the radial column allows the frits to be thin since the shape stability of a cylindrical object is many times that of a flat surfaced object with the same material thickness. Thinner frit causes more viability and less ruptured cells.

The bead size, bead rigidity, packing density, inlet-surface area/outlet-surface area ratio (I/O-ratio) and the volumetric flow rate, now are some of the possible parameters for the proper dynamic resistance to support even distribution of the liquid to be processed. The proper balance between these parameters have to be optimized for each individual application. Then the resulting dynamic resistance to support even distribution is determent for the application.

Preferably, for the frits one or more of the following applies: made from stainless steel; electro polished surface; hydrophilic surface; comprising at least or exactly one or two or three or four layers or sheets of woven wires of stainless steel, directly laid on top of each other, at least one of the sheets, e.g. the filter layer, preferably woven according to a plain weave or twilled weave or plain dutch weave or twilled dutch weave or reversed plain dutch weave or reversed twilled dutch weave or five-peddle weave pattern; the sheets provide a united assembly, preferably are mutually sintered (also called diffusion bonded); at least one or two, e.g. each, sheet is woven from wires having a diameter at least 10% or 20% different, e.g. larger or smaller, from the immediately adjacent sheet; the wire thickness among sheets increases from the one to the other face of the frit, preferably from the face facing and/or delimiting the packed bed; the wire thickness of the sheets is at least 25 or 50 micrometer (equals 0.025 and 0.05 millimeter) and/or not more than 500 micrometer (equals 0.5 millimeter); at least one or two, e.g. each, sheet has a pore size at least 10% or 20% different, e.g. larger or smaller, from the immediately adjacent sheet; the pore size among sheets increases from the one to the other face of the frit, preferably from the face facing and/or delimiting the packed bed; the sheet, e.g. reinforcement sheet, having the thickest wires and/or largest pore size, e.g. at least 500 micrometer (0.5 millimeter) is the, preferably ultimate, inner- or outermost sheet of the frit, preferably the sheet the most remote from the packed bed; thickness at least 0.3 or 0.8 or 1.0 millimeter and/or not more than 1.2 or 1.5 millimeter; pore size (this is the "nominal" pore size, defined by the diameter of the largest rigid sphere that can pass the pore) at least 50 or 100 and/or not more than 200 or 500 micrometer (equals 0.05, 0.1, 0.2 and 0.5, respectively, millimeter); welded, preferably by a continuous weld bead, to the axial end plate; the number of sheets of the inner frit is one or two or three more compared to the outer frit; contains a single filter layer; a filter layer is directly exposed to the packed bed; at the side of the filter layer facing the packed bed, a layer, e.g. protective layer, is absent; a filter layer provides the surface layer; has at the one side of a filter layer no layer or merely a protective layer and at the other side merely a protective or dispersion layer and possibly exactly one or two further layers, preferably reinforcing layers.

Preferably, the I/O ratio is at least 1.5:1 or 2:1 or 2.5:1 and/or not more than 3:1 or 3.5:1 or 4:1 or 5:1 or 10:1. I/O is the ratio between the radius (illustrated in FIG. 1 by arrows R1 and R2) of the outer and inner frit of the column.

Bed height preferably is at least 10 or 20 and/or not more than 100 or 150 or 200 or 300 millimeter. Bed height (illustrated in FIG. 1 by arrow H) is the distance between the inner and outer frit or, in different words, the difference between the diameter of the inner and outer frit. Bed volume preferably is at least 10 or 25 or 50 or 100 or 200 or 250 or 500 milliliter and/or not more than 10 or 20 or 150 or 250 litre.

The diameter (in millimeter) of the inner frit preferably is: at least 10 or 15 or 20 and/or not more than 80 or 100 or 150 or 300, e.g. 23 or 50 or 60 or 100.

Alternatively, in stead of a complete doughnut or torus shaped bed to contain the beads, a segment of it is used (viz. FIG. 13).

In the typically cylindrical space delimited by the inner frit, a core member is preferably located, the external wall of which delimits an inner flow channel with the inner frit.

Preferably the outer flow channel delimited outside the outer frit has a width at least 0.5 millimeter and/or not more than 2 or 3 or 5 or 10 millimeter. Preferably the inner flow channel has a width at least 0.5 millimeter and/or not more than 2 or 3 or 5 or 10 millimeter, more preferably equals the outer flow channel width times the I/O ratio (also named "I/O-width") and/or its width is at least 0.5 or 1 or 2 and/or not more than 5 or 10 millimeter wider than the outer flow channel width. In case of a conical core member the inner flow channel width preferably is at least 0.5 and/or not more than 1 or 2 millimeter at the one axial end and at least 1 or near I/O-width and/or not more than 3 or 4 or 6 millimeter at the opposite longitudinal end ("longitudinal" is parallel to the axial direction of the column) and/or is at least 1 or 2 and/or not more than 3 or 5 or 10 millimeter wider than the narrow axial end.

Preferably, the invention is applied in a continuous process in which a subset of two, three or more, e.g. five, columns, preferably mutually identical, are connected in series, preferably not more than 5 or 10. For the process, the number of columns required for the complete set equals the number of columns of the subset, plus one, two, three or more columns, preferably identical to the columns of the subset. The process liquid, e.g. crude cell culture harvest, is supplied to the most upstream column of the subset, flows successively through the in series connected columns and, e.g. as from the target product depleted culture and cells, leaves the subset through the most downstream and flows e.g. into the downstream, e.g. waste, collection vessel. As soon as sufficient time or a predetermined quantity of time has elapsed, e.g. the time at which the packed bed of the most upstream column has captured a predetermined quantity of product, e.g. is become saturated with product, the most upstream column is disconnected from the subset and removed from the series connection and a replacement, identical, column, preferably containing a fresh or reset packed bed, is added such that it is connected in series downstream from the most downstream column of the subset and this process is repeated. During the time required to saturate the most upstream column of the subset with target from the process liquid, the most recently from the subset disconnected, saturated column is off-line processed to reset the packed bed (e.g. wash, elute/desorb, clear and prepare the bed) to become available for addition to the subset to become saturated again. The column with low resistance to flow allows this off-line process to be performed at much higher velocities, possibly up to 10 times the flow rate through the subset. This creates a time-lapse, responsible for a reduction of the minimum number of columns required and therewith reduces the total volume of the complete set. This cycle is repeated several times such that repeatedly after time elapse a most upstream column is removed from and a most downstream column is added to the in series connected subset of columns such that the number of columns of the subset remains the same during the complete process. Typically, the column removed from the series connection has its packed bed processed, e.g. cleaned, to become reset and thus fit for returning to the series connection, initially as the most downstream column and subsequently obtaining successively the upstream rankings as other reset columns are added downstream. The reset procedure is preferably started and completed within the time elapse between removing two successive columns from the series connection, such that a column is only as briefly as possible removed from the series connection and the least possible number of columns is needed. Preferably, the number of columns being part of the continuous process is the number of columns connected in series (being the subset) plus a single column in the reset procedure plus possibly one or two spare columns.

The columns of the subset are preferably mutually connected such that the process liquid flows through the packed bed in the same direction for all columns (i.e. radially inward or outward), however in an alternative at least one of the columns has its packed bed flown through in the direction opposite to at least one or two other columns of the subset. E.g. of the subset the most upstream column has its packed bed flown through in radially inward direction and a more downstream column of the same subset has its packed bed flown through in radially outward direction.

For the same volumetric yield of captured product, the continuous process requires less volume of beads, e.g. at least 25% or 50% or 75% less, compared to the batch process.

The packed bed volume of each column associated with this continuous process, is preferably at least 25 or 100 or 250 milliliter and/or not more than 10 or 20 or 100 litre.

An object of this continuous process is the significant reduction of ecological footprint, setup time, process time, waste materials, time and space spend in the clean room.

The column, preferably the subset in the continuous process, could be used to remove an, e.g. growth rate limiting, contaminant from the process liquid, wherein the contaminant is the target for the packed bed and the liquid leaving the column or subset is e.g. as culture media supplied to a cell culture.

With a continuous process, it is very important that the process liquid that leaves a more upstream column, is still free from contaminations, e.g. damaged cells or cell contents such as protein or DNA. This can be provided by designing the outlet frit such that cells can pass it damage free. For both the continuous and batch process, the inlet and/or outlet frit is preferably designed such that cells can pass it damage free.

The beads preferably have a diameter at least 200 and/or not more than 500 or 1000 micrometer (equals 0.2 and 1.0 millimeter) and/or are hydrophilic.

In an embodiment, the invention relates to a liquid chromatography column, utilizing horizontal or radial flow of sample material passing there through comprising one or more of: a housing defining a chamber therein and including at least one, preferably removable, axial/longitudinal end section; a first (outer) and second (inner) axially/longitudinally extending porous frits or membranes positioned within said chamber of said housing; a bed or packing of, preferably particulate, chromatographic separation material positioned within said chamber of said housing and intermediate said porous frits, the first or outer of said porous frits being adjacent a housing wall and defining with said wall a cylindrical shaped ring type outer flow channel, the second or inner of said porous frits being positioned adjacent an optional core member and defining with said core member a cylindrical shaped ring type inner flow channel; distribution means operatively connected to said outer flow channel; collector means operatively connected to said inner flow channel; a supply channel (also named liquid inlet) operatively connected to the distribution means and an exhaust channel (also named liquid outlet), operatively connected to the collector means; said distribution means and said outer flow channel being constructed to direct associated material to be separated in said bed evenly across an axial/longitudinal length of said bed in a substantially horizontal direction.

Further, said porous frits are coaxially positioned with respect to one another. Practically, said first porous frit having a larger cross-section than said second porous frit and said core member, if applied, is centrally located in said housing chamber coaxial with the first and second frit.

Preferably, one or more of the following further features apply to the inventive column: one of the axial end sections, is penetrated by both the supply channel (or liquid inlet) and the exhaust channel (or liquid outlet); the exhaust channel is coaxial with the first and/or second frit; the outer flow channel is radially spaced from the housing centre and/or the exhaust channel; the housing has a substantially cylindrical wall; the first and second frit are part of a cartridge removably contained in the housing; at the one axial end the first and second frit are connected by an end wall closing the space between the first and second frit at said axial end and possibly having a passage for the exhaust channel or core member, and/or at the opposite axial end the inner flow channel is closed by an end wall connected to the second frit; the outer and/or inner flow channel extends substantially the complete height of the chamber; the packed bed, in the operative position within the chamber, extends from the end section opposite the axial end wall beyond the axially extending housing wall; an outflow channel, connecting to one or more of the inner flow channel, the collector space, the exhaust channel, extends inside, preferably lengthwise of, the core member and/or debouches at the axial/longitudinal end of the core member within the chamber; the core member extends substantially the complete height of the chamber; the core member penetrates an axial end section; the core member projects from the axial end section; the axial end section has a central bore penetrated by the core member; the core member keeps with its axial/longitudinal free end a gap with the associated axial end section and/or tapers to a narrow dimension towards said axial end section; the distribution means comprise a radially outward narrowing, preferably the core member circumventing distribution space, preferably between the axial end section, and the space containing the packing and the outer flow channel preferably connects to, more preferably debouches into, said distribution space; the cross sectional area of the inner flow channel increases, preferably continuously, along the axial direction, preferably due to the taper of the core member; one of the axial end sections, preferably the one associated with the axial free end of the core member, contains a means, such as a closable fill port, to supply the space between the frits with packing material for column packing purposes, while the column is completely assembled (e.g. a fill system according to WO2007136247 (Raedts); between the core member and at least one of the axial end section and the cartridge or the end wall connecting the first and second frit a seal is present; the column has a handy outer dimension in the order of one or five or ten litre contents, possibly even up to one hundred litre.

Preferably, the invention is directed to one or more of: a homogenous packed bed matrix of adsorptive beads with defined bead size, to create a controlled-porosity matrix over the entire packed bed such that it enables unhindered passage of concentrated unclarified mammalian (or any other) cell culture harvest; cell culture harvest cell-diameter is approximately 0.1-10% of bead diameter; mean bead diameter is approximately 120-500 μm; CHO cells are typically about 5-15 or 20 μm; homogenous distribution of cell culture cells within the porous matrix is resulting from the flow focusing brought about by the increase in resistance as explained by the Kozeny Carman equation as expressed by the radially packed bed; the velocity increase travelling from inlet to outlet, or decrease when travelling in reverse direction, of the radial packed bed column creates the resistance that drives the focusing/homogenous distribution of the cells without reducing the porosity between the bead matrix within the packed bed; a multi column (semi) continuous operation, in which a subset of serially connected columns continuously is being loaded with cell culture harvest.

When operating and processing an e.g. high density "continuous-perfusion" cell culture, the majority of culture cells are retained within the cell culture upstream the column, resulting in a cell culture with extreme cell densities and in which only a relatively small volume containing a limited amount of cell matter continuously is send to be processed downstream. The column can be fed, e.g. connected, directly to the cell culture exit with the option to either perform the primary capture of product while sending the column effluent to the collection vessel or recycling the feed via the effluent (partly) back into the upstream source, alternatively the column can be packed with a big bead adsorbent programmed to capture/remove a e.g. growth rate limiting, contaminant from the continuous perfusion cell culture while recycling cleaned media back into the cell culture.

When used for primary capture the column is exchanged for a clean one to allow recovery of the product. Alternatively, the saturated column capturing the contaminant can be exchanged for a clean one to allow the contaminated column to be cleaned.

Thus also this process is designed as a continuous process.

BRIEF DESCRIPTION OF THE DRAWINGS

The accompanying drawings, which are incorporated and form a part of the specification, illustrate an embodiment of the invention and, together with the description, serve to explain the principles of the invention. Shown is in.

DESCRIPTION OF THE PREFERRED EMBODIMENTS

Figure 3:
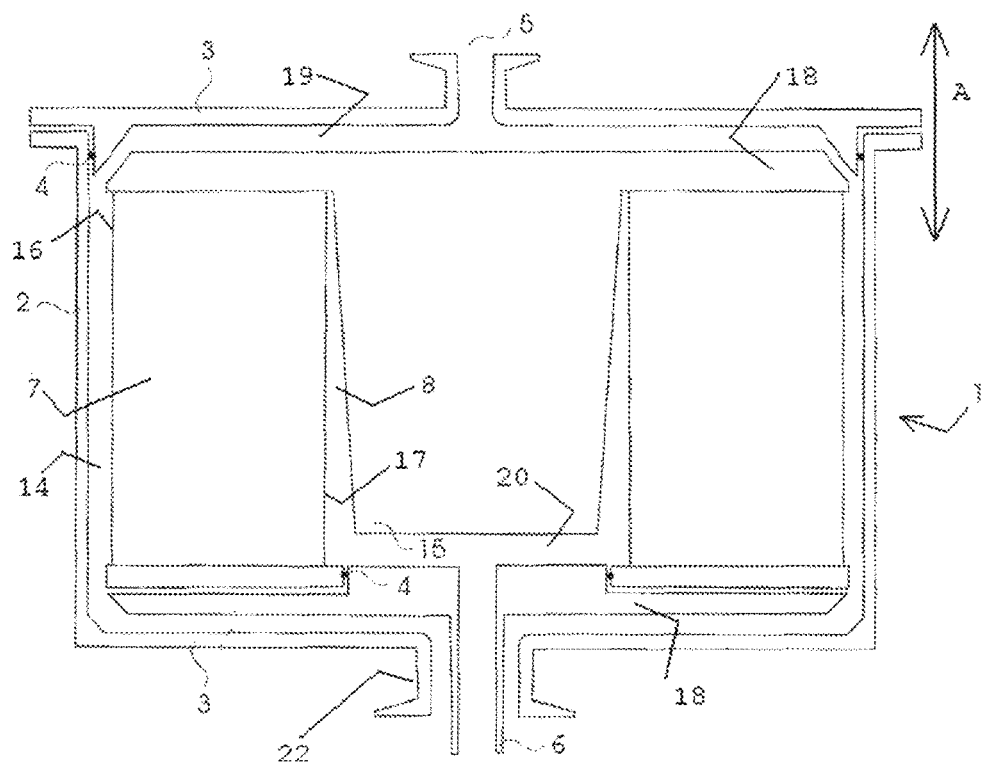
Figure 4:
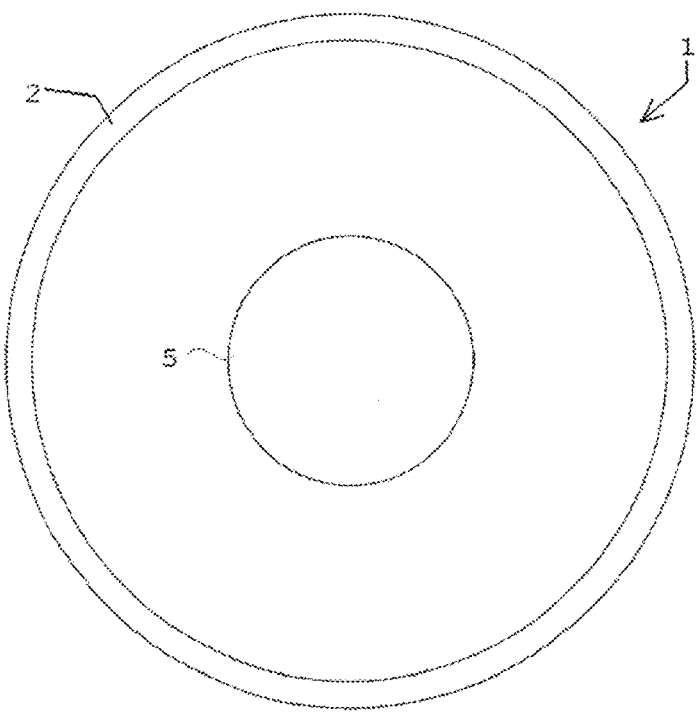
FIG. 4 the column of FIG. 3 in top view.
Figure 5:
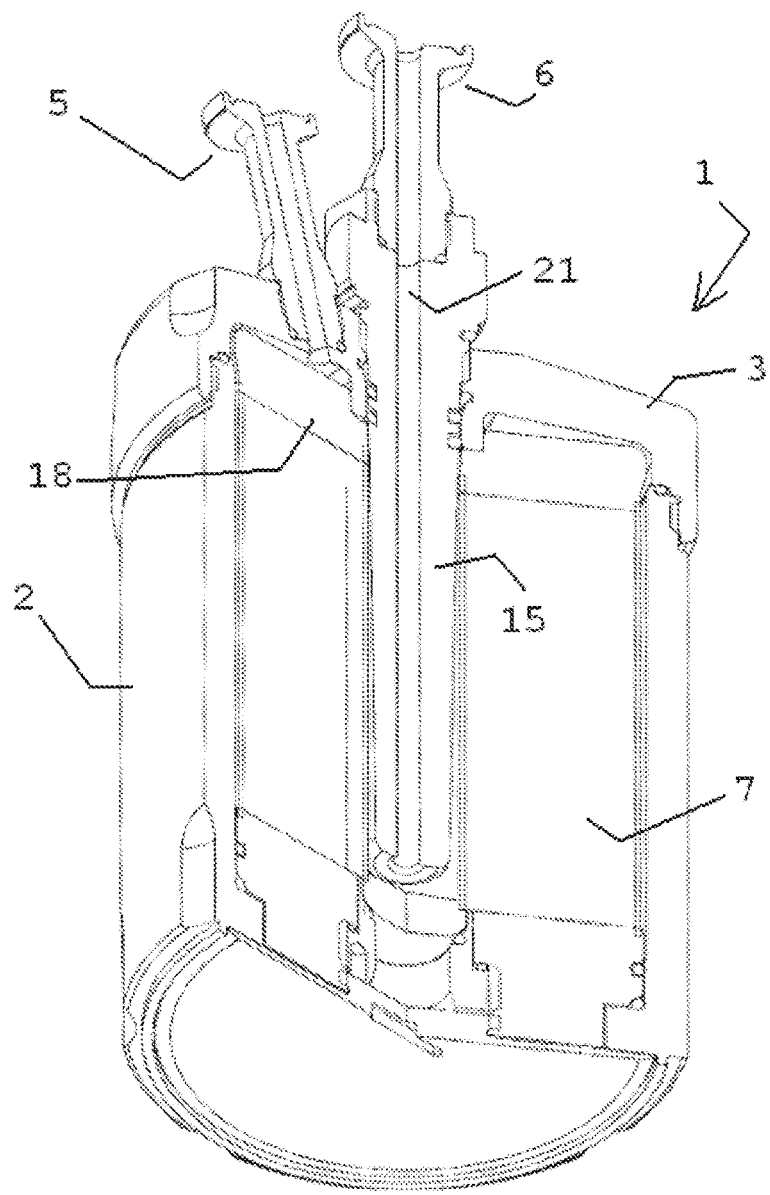
FIG. 5 another column in perspective view from below, partly cut away.
Figure 6:
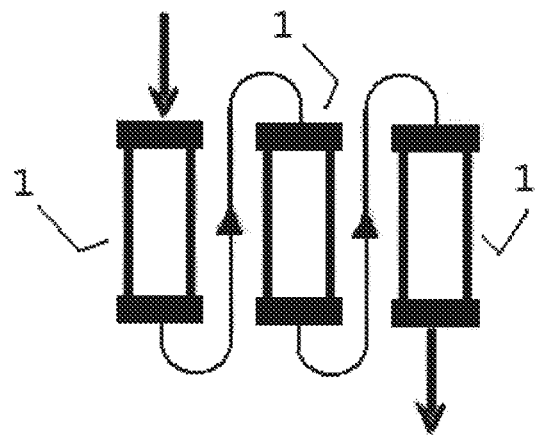
FIG. 6 and FIG. 13 are two examples of a continuous process wherein a subset of three columns in series are applied.

The following reference numbers are used: column 1; cylindrical housing wall 2; axial housing end plate 3; seal 4; liquid inlet 5; liquid outlet 6; packed bed 7; inner flow channel 8; packed bed fill opening 9; connector 10; fill tube 11 for packed bed; seal 12; seal 13; outer flow channel 14; core 15; inner frit 16; outer frit 17; axial bed end plate 18; distribution space 19; collector space 20; outflow channel 21; liquid outlet 22; bead height H; outer frit radius R1; inner frit radius R2; axial direction arrow A (FIG. 3). The radial direction is perpendicular to the axial direction.

Each of the liquid chromatography columns shown in FIG. 1-5 comprises: a housing, of cylindrical shape, defining a chamber therein and including a removable axial end plate 3 of circular shape; a first (outer) and second (inner) porous frits 16, 17 or membranes of cylindrical shape; a bed 7 or packing of particulate chromatographic separation material positioned intermediate said porous frits; optionally an axially extending core 15. The axially extending cylindrical external housing wall 2, first 17 and second 16 frit and core 15 are coaxial.

Figure 1:
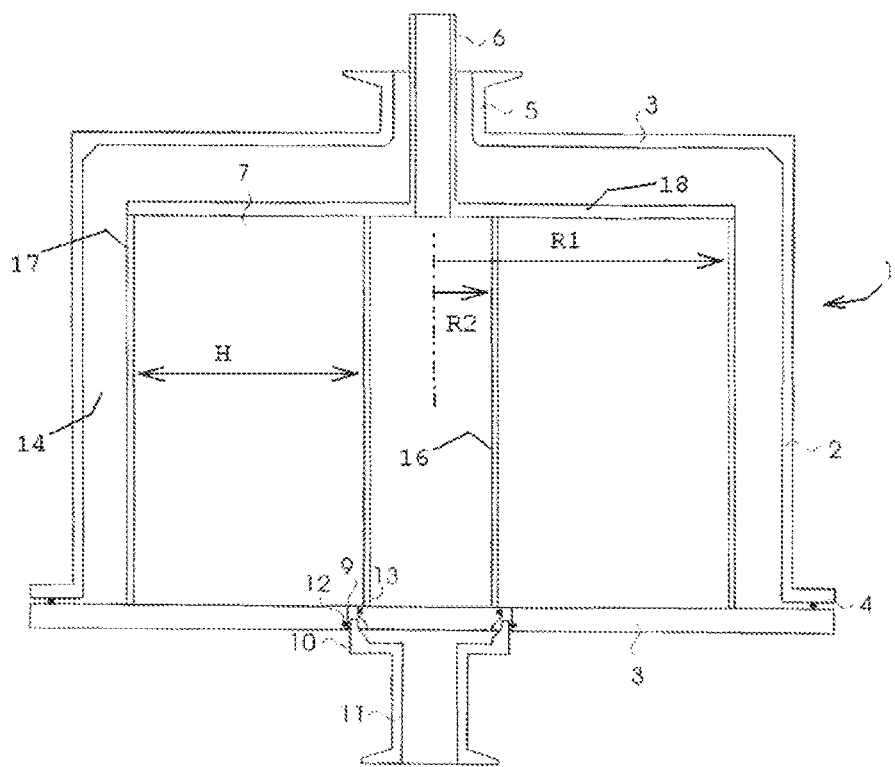
FIGS. 1-3 examples of the column in sectional side view.
Figure 2:
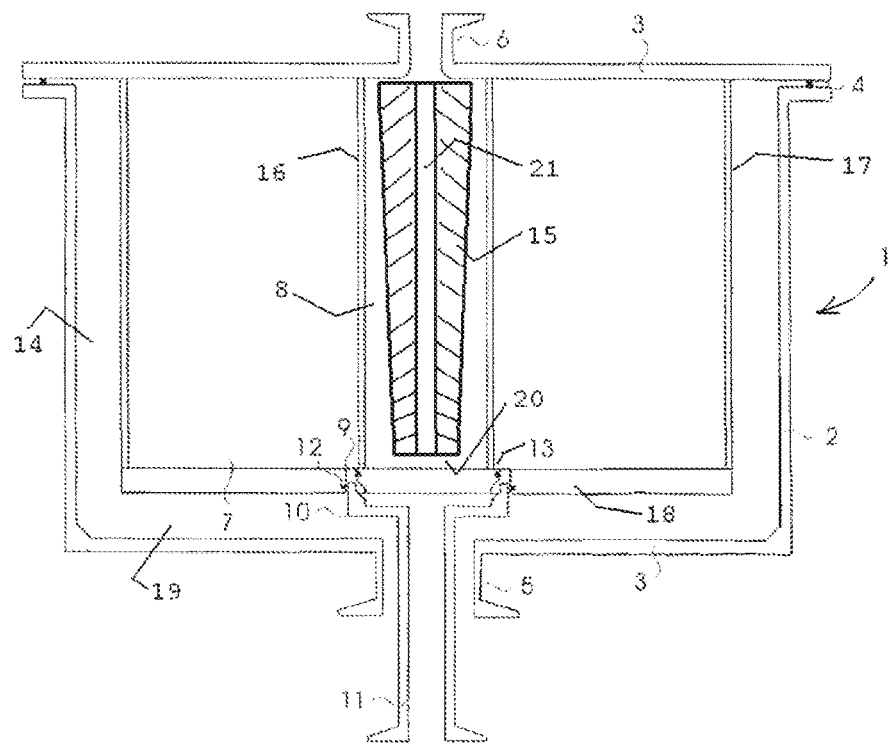

The first or outer frit 17 is adjacent the axially extending cylindrical external housing wall 2 and defines with said wall a cylindrical shaped ring type outer flow channel 14, e.g. 0.5 millimeter wide. The second or inner frit 16 is adjacent the core member 15 and defines with said core member a cylindrical or conical shaped ring type inner flow channel 8, e.g. 1.0 millimeter wide. In FIG. 1 a core member 15 is absent.

The axially top end plate 3 is, in an embodiment, penetrated by both a supply and exhaust channel 5, 6. These channels are coaxial with the frits.

The first and second frit can be part of a cartridge removably contained in the housing.

At both axial ends the first and second frit are connected by a radial extending end wall 18 closing the space between the first and second frit 16, 17 to capture the doughnut shaped packing providing the filter bed.

The filter bed 7 plus the core 15 almost completely fill the housing 1. Between the top face 18 of the filter bed 7 and the bottom face of the axial end plate 3 there is a distribution space 19 into which the outer flow channel 14 debouches. This distribution space possibly tapers in the radial outward direction and merges at the thus narrowed radial outer circumference with the circumferential extending outer flow channel 14. The circumferential inner flow channel 8, surrounding the core 15, tapers in the axial direction from the one to the opposite axial bed end plate 18 along the core 15 and merges at the lower end of the core with a collector space 20 delimited between the lower core end and the bottom end 3 of the housing or the end wall 18. This tapered shape of the inner flow channel 8, providing a wide and a narrow axial end, is due to the axial taper of the core. The taper of the distribution space 19 and of the inner flow channel 8 optimises flow characteristics. An outflow channel 21 extends lengthwise through the core 15 (FIG. 2) and connects to the liquid outlet 6 and the collector space 20.

FIG. 3 shows an embodiment wherein part of the liquid entering through liquid inlet 5 exits the column 1 without passing the outer frit 17, but in stead flows via the outer flow channel 14 to the liquid outlet 22, thus exits the column 1 without being processed. In an alternative embodiment such liquid outlet 22 could be absent and the outer flow channel 14 could be sealed at its axial end remote from space 19, e.g. by connecting the wall 18 to the wall 22.

The bottom end of the filter bed 7 contains a centrally located closable fill port 9, to supply the space between the frits 16, 17 with packing material for column packing purposes. This fill port 9 and associated seals and parts 10 and 11 could be absent, e.g. if the filter bed 7 is filled with packing material in a different manner.

O-ring type seals are applied to seal the core to the axial end plate and the filter bed and to seal the lid to the axial extending housing wall.

Figures 7A, 7B, 7C, 7D:
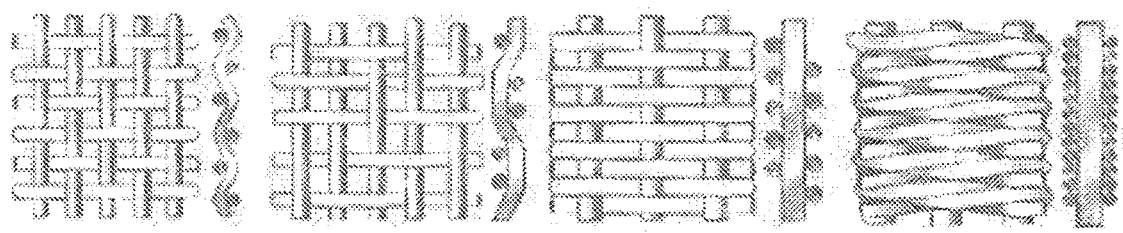
FIGS. 7(*a-d*) and 8(*a-c*) illustrate weave patterns for a layer of a frit.
Figures 8A, 8B, 8C:
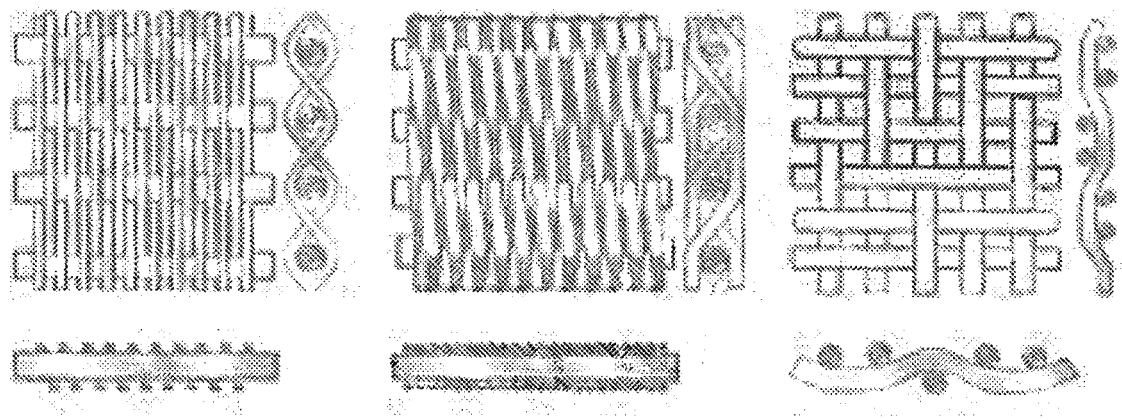
Figure 10:
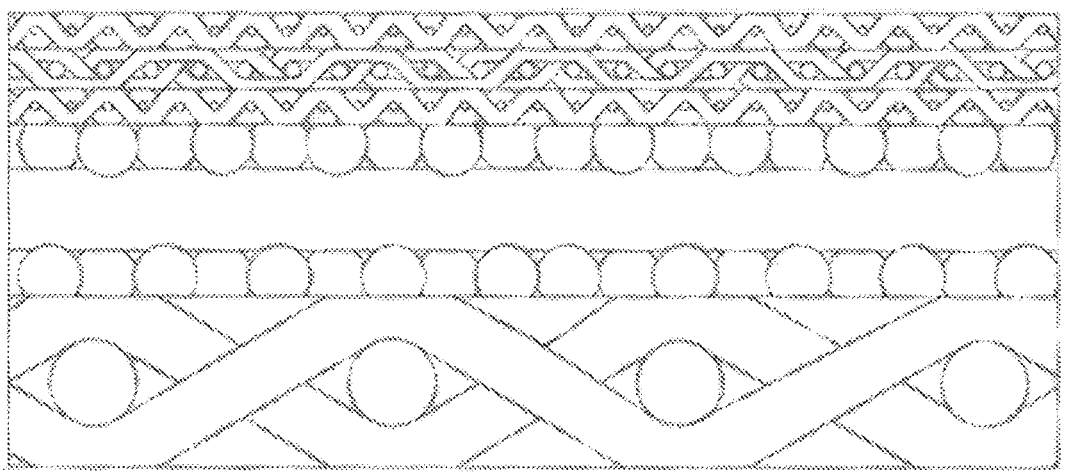
FIGS. 10-11 sectional side views of prior art frits.
Figure 9:
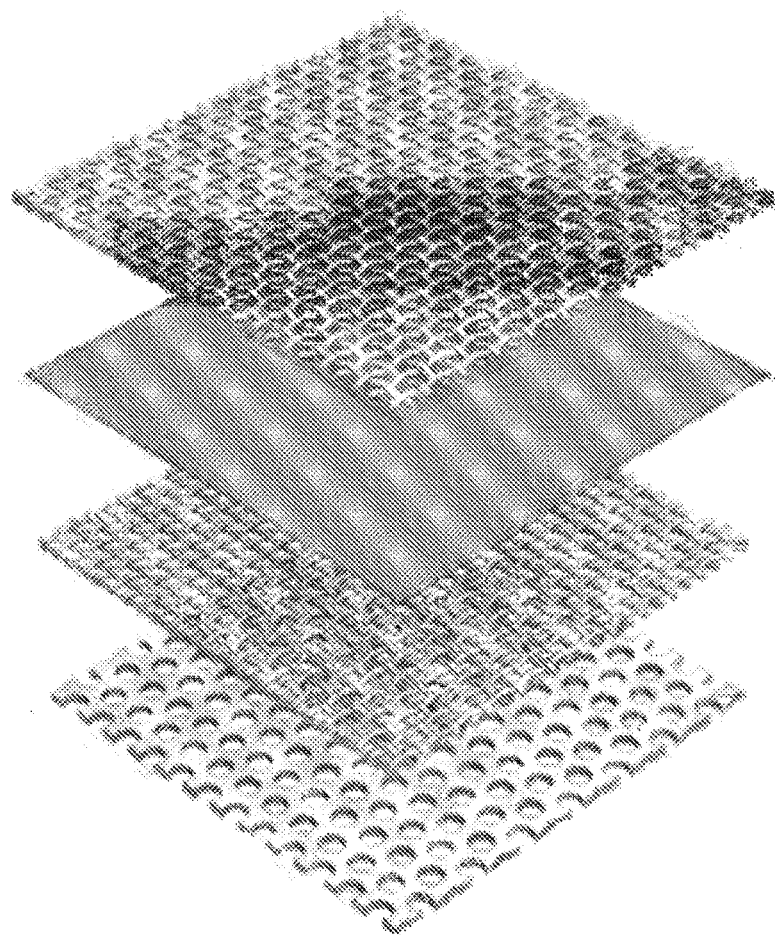
FIG. 9 a perspective, exploded view, of a prior art frit.
Figure 11:
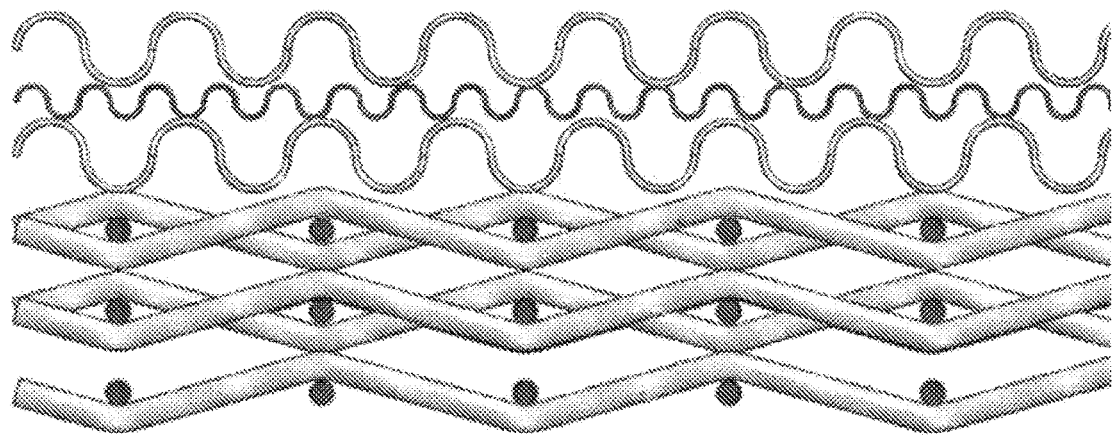
Figure 12:
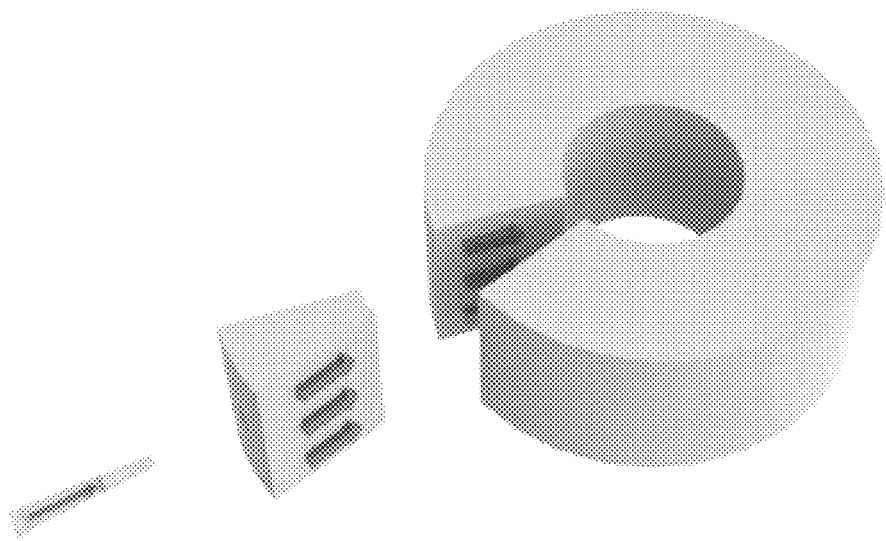
FIG. 12 a perspective view of a torus shaped filter bed.
Figure 13:
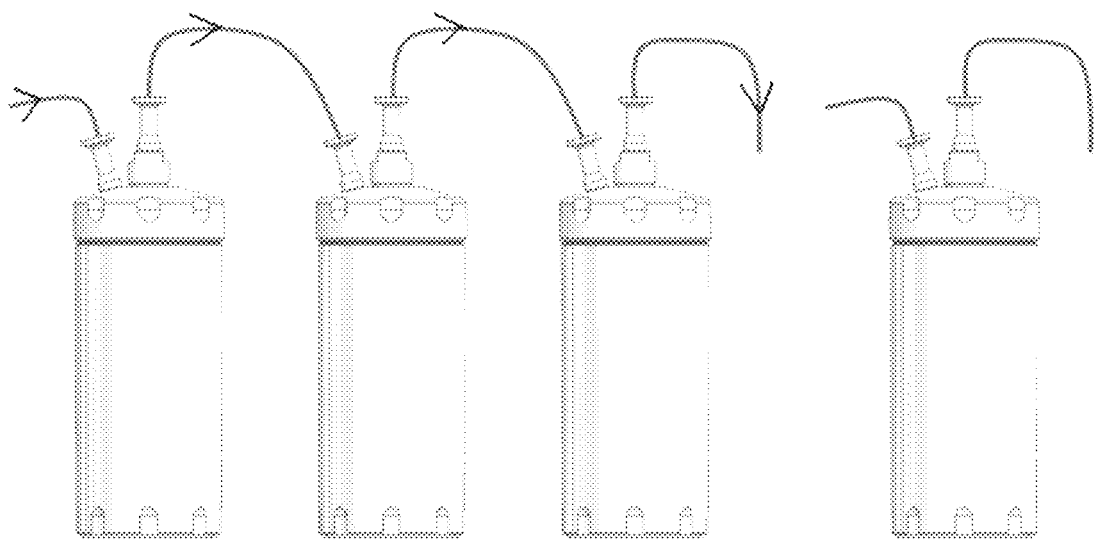

FIG. 7a shows plain weave (PL), FIG. 7b twilled weave (TL), FIG. 7c plain dutch weave (PDW), FIG. 7d twilled dutch weave (TDW). FIG. 8a shows reversed plain dutch weave (PZ), FIG. 8b reversed twilled dutch weave (KPZ), FIG. 8c five-heddle weave (FHD). FIG. 9 shows a four layer (from top to bottom: protective layer, filter layer, distribution layer, single reinforcement layer), FIG. 10 a five layer (double reinforcement layer) and FIG. 11 a six layer (triple reinforcement layer) frit. Compared to the frits of FIG. 9-11, a frit of the invention is obtained as follows: In case of FIG. 9, by cancelling one or both of the top and bottom most layer (as seen in the drawing). In case of FIG. 10 or FIG. 11 by cancelling at least one of the top layer (protective layer) and one, two or all of the reinforcing layers. FIG. 12 illustrates a bed segment taken from the torus shaped bed filter.

The column operates as follows: Fluid is introduced through the supply channel into the distribution space and from there flows radially outward towards the inlet channel. In the inlet channel the fluid flows axially downward to be evenly distributed across the complete surface of the outer frit. Then, passing the outer frit, the fluid flows radially inward through the packing to arrive at the inner frit. Subsequently the fluid flows evenly distributed across the complete surface of the inner frit through the inner frit to arrive into the outlet channel. The fluid flows axially downward through the outlet channel, along the outer face of the core to be collected in the collection space. From there the fluid flows into the exhaust channel. If the core contains the exhaust channel, e.g. as in FIG. 5, the fluid flows axially upward through the core.

Further embodiments are also covered by the attached claims. E.g. the flow direction of the introduced fluid can be opposite, for which the supply, exhaust, inlet and outlet elements are interchanged. Also different embodiments belong to the invention. Features of different in here disclosed embodiments can in different manners be combined and different aspects of some features are regarded mutually exchangeable. All described or in the drawing disclosed features provide as such or in arbitrary combination the subject matter of the invention, also independent from their arrangement in the claims or their referral. The drawing, the specification and claims contain many features in combination. The skilled person will consider these also individually and combine them to further embodiments.

Conclusion: preferably a liquid chromatography column, utilizing horizontal or radial flow of sample material passing there through, preferably in inward direction, comprising: a housing defining a chamber therein; a first and second axially or longitudinally extending porous frits positioned within said chamber of said housing; a bed or packing of, preferably particulate, chromatographic separation material positioned within said chamber of said housing and intermediate said porous frits, the first of said porous frits being adjacent said housing and an outer flow channel, the second of said porous frits being positioned adjacent an optional a core member and an inner flow channel; the bed is torus shaped; distribution means operatively connected to said outer flow channel; collector means operatively connected to said inner flow channel, said distribution means and said outer flow channel being constructed to direct associated material to be separated in said bed evenly across a longitudinal length of said bed in a substantially horizontal direction preferably said porous frits are coaxially positioned with respect to one another, said first porous frit having a larger cross-section than said second porous frit, and said core member is centrally located in said housing chamber.

The invention claimed is:

1. A liquid chromatography column configured to be radially flown through by a process liquid, the liquid chromatography column comprising:
   a packed bed of beads of between approximately 120 micrometer and approximately 1 millimeter diameter, the beads being hydrophilic, the beads being configured to capture biologics from mammalian CHO cells or cell culture or cell fermentation harvests, the cells having a diameter of 0.1-10% of bead diameter from the process liquid, the packed bed being held between an outer frit and an inner frit of the column, the packed bed being torus shaped,
   wherein the outer frit has a first surface area and the inner frit has a second surface area which is smaller than the first surface area,
   the ratio between the first surface area and the second surface area is equal to a surface area ratio of the column and is less than 5:1 such that the first surface area is not more than 5 times the second surface area,
   the outer frit is adjacent an axially extending external housing wall of the column, the inner frit being disposed closer to a central longitudinal axis of the column, a core member being disposed in the space delimited by the inner frit, the core member having an external wall delimiting an inner flow channel with the inner frit, the inner flow channel having a width of at least 0.5 mm, the inner flow channel tapering in an axial direction from one end to an opposite end of the column along the core member,
   the column is configured such that the liquid to be processed is first distributed across the surface of the outer frit, subsequently passes through the outer frit, subsequently flows radially inward through the packed bed to arrive at the inner frit, subsequently passes through the inner frit to enter into the inner flow channel, and subsequently passes in an axial direction along the core member and finally exits the column.

2. The column according to claim 1, wherein the surface area ratio of the column is at least 1.5:1 such that the first surface area is at least 1.5 times the second surface area.

3. The column according to claim 1, wherein the surface area ratio of the column is not more than 4:1 such that the surface area is not more than 4 times the second surface area.

4. The column according to claim 1, wherein the outer frit and the inner frit have a hydrophilic surface.

5. The column according to claim 1, wherein each of the outer frit and the inner frit comprises at least two layers or sheets of woven wires of stainless steel directly on top of one another.

6. The column according to claim 1, wherein the packed bed height is at least 10 millimeters.

7. The column according to claim 1, wherein the packed bed volume is at least 10 milliliters.

8. The column according to claim 1, wherein the diameter of the inner frit is at least 10 millimeters.

9. The column according to claim 1, wherein the beads are configured to capture biologics from the process liquid having a diameter of 5-20 micrometers.

10. The column according to claim 1, wherein the outer frit and the inner frit are made from stainless steel and have a thickness of at least 0.3 mm.

11. The column according to claim 1, wherein the packed bed height is not more than 200 millimeters.

12. The column according to claim 5, wherein the packed bed height is not more than 200 millimeters.

13. The column according to claim 1, wherein the packed bed volume is not more than 20 liters.

14. The column according to claim 8, wherein the packed bed volume is not more than 20 liters.

15. The column according to claim 1, wherein the diameter of the inner frit is below 150 millimeters.

16. The column according to claim 8, wherein the diameter of the inner frit is below 150 millimeters.

17. A liquid chromatography column configured to be radially flown through by a process liquid, the liquid chromatography column comprising:
- a packed bed of beads of between approximately 120 micrometer and approximately 1 millimeter diameter, the beads being hydrophilic, the beads being configured to capture biologics from mammalian CHO cells or cell culture or cell fermentation harvests, the cells having a diameter of 0.1-10% of bead diameter from the process liquid, the packed bed being held between an outer frit and an inner frit of the column, the packed bed being torus shaped,
- wherein the outer frit has a first surface area and the inner frit has a second surface area which is smaller than the first surface area,
- the ratio between the first surface area and the second surface area is equal to a surface area ratio of the column and is less than 5:1 such that the first surface area is not more than 5 times the second surface area,
- the outer frit and the inner frit have a hydrophilic surface,
- each of the outer frit and the inner frit comprising at least two layers or sheets of woven wires of stainless steel directly on top of one another, or the outer frit and the inner frit being made from stainless steel and having a thickness of at least 0.3 mm,
- the outer frit is adjacent an axially extending external housing wall of the column, the inner frit being disposed closer to a central longitudinal axis of the column, a core member being disposed in the space delimited by the inner frit, the core member having an external wall delimiting an inner flow channel with the inner frit, the inner flow channel having a width of at least 0.5 mm, the inner flow channel tapering in an axial direction from one end to an opposite end of the column along the core member,
- the column is configured such that the liquid to be processed is first distributed across the surface of the outer frit, subsequently passes through the outer frit, subsequently flows radially inward through the packed bed to arrive at the inner frit, subsequently passes through the inner frit to enter into the inner flow channel, and subsequently passes in an axial direction along the core member and finally exits the column.

18. A set of mutually identical liquid chromatography columns, each column of the set of liquid chromatography columns being configured to be radially flown through by a process liquid, each column of the set of liquid chromatography columns comprising:
- a packed bed of beads of between approximately 120 micrometer and approximately 1 millimeter diameter, the beads being hydrophilic, the beads being configured to capture biologics from mammalian CHO cells or cell culture or cell fermentation harvests, the cells having a diameter of 0.1-10% of bead diameter from the process liquid, the packed bed being held between an outer frit and an inner frit of the column, the packed bed being torus shaped,
- wherein, for each column of the set of liquid chromatography columns:
  - the outer frit has a first surface area and the inner frit has a second surface area which is smaller than the first surface area,
  - the ratio between the first surface area and the second surface area is equal to a surface area ratio of the column and is less than 5:1 such that the first surface area is not more than 5 times the second surface area,
  - the outer frit is adjacent an axially extending external housing wall of the column,
  - the inner frit is disposed closer to a central longitudinal axis of the column,
  - a core member is disposed in the space delimited by the inner frit, the core member having an external wall delimiting an inner flow channel with the inner frit, the inner flow channel having a width of at least 0.5 mm, the inner flow channel tapering in an axial direction from one end to an opposite end of the column along the core member,
- each column of the set of liquid chromatography columns is configured such that the liquid to be processed is first distributed across the surface of the outer frit, subsequently passes through the outer frit, subsequently flows radially inward through the packed bed to arrive at the inner frit, subsequently passes through the inner frit to enter into the inner flow channel, and subsequently passes in an axial direction along the core member and finally exits the column,
- wherein the set of liquid chromatography columns is configured such that the process liquid is fed to a subset of at least two of the set of liquid chromatography columns directly from a source, the process liquid, depleted by the subset of liquid chromatography columns from a product, leaving said subset of liquid chromatography columns after having passed radially through each of the liquid chromatography columns of the subset of liquid chromatography columns,
- the liquid chromatography columns of the subset of at least two of the set of liquid chromatography columns are connected in series with each other, the subset being configured such that the process liquid is supplied to the most upstream column of the subset of liquid chromatography columns, flows successively through the liquid chromatography columns connected in series and leaves the subset of liquid chromatography columns through the most downstream column and after time elapse,
- in a case in which the most upstream column becomes saturated with product, the most upstream column is configured to be disconnected from the subset and removed from the series connection and a replacement column from the set is configured to be added to the subset such that the replacement column is connected in series downstream from the most downstream column of the subset, wherein each of the next most upstream columns are configured to be disconnected and removed from the subset of liquid chromatography columns, each of the removed columns being configured to be off-line processed to reset the packed bed of the removed column such that this each of the removed columns is made ready to become available for the subset to become saturated again when each of the removed columns is connected in series as the most downstream column of the subset of liquid chromatography columns.

* * * * *